United States Patent [19]

Smith et al.

[11] 3,890,325

[45] June 17, 1975

[54] LEUROCOLOMBINE

[75] Inventors: Susan L. Smith; Douglas E. Dorman, both of Indianapolis, Ind.

[73] Assignee: Eli Lilly and Company, Indianapolis, Ind.

[22] Filed: May 15, 1974

[21] Appl. No.: 469,982

[52] U.S. Cl.............................. 260/287 R; 424/258
[51] Int. Cl............................................. C07d 33/50
[58] Field of Search........................ 260/287 R, 236

Primary Examiner—Donald G. Daus
Assistant Examiner—David E. Wheeler
Attorney, Agent, or Firm—James L. Rowe; Everet F. Smith

[57] ABSTRACT

Leurocolombine, a novel indole-dihydroindole alkaloid obtained in small quantities from *Catharanthus roseus* active as antimitotic.

2 Claims, No Drawings

LEUROCOLOMBINE

BACKGROUND OF THE INVENTION

Several naturally occurring alkaloids obtainable from *Catharanthus roseus* have been found active in the treatment of experimental malignancies in animals. Among thses are leurosine (U.S. Pat. No. 3,370,057), vincaleukoblastine (vinblastine) to be referred to hereinafter as VLB (U.S. Pat. No. 3,097,137), leurosidine (vinrosidine) and leurocristine (VCR or vincristine) (both in U.S. Pat. No. 3,204,220). Two of these alkaloids, VLB and vincristine, are now marketed as drugs for the treatment of malignancies, particularly the Leukemias and related diseases, in humans. Of these marketed compounds, vincristine is a most active and useful agent in the treatment of leukemias but is also the least abundant of the anti-neoplastic alkaloids of *Vinca rosea*.

SUMMARY OF THE INVENTION

This invention provides a novel indole-dihydroindole alkaloid, leurocolombine, having the following physical and chemical characteristics: Leurocolombine is a white solid exhibiting absorption bands in the infrared at the following wave-lengths, expressed in microns: 2.80 (hydroxy) 2.88 (NH), 3.35 (shoulder at 3.45), 5.74, 6.18, 6.65, 6.82, 6.95, 7.25, 7.50, 8.11 (broad) 9.60 (broad), 9.90, 10.75 (broad); pKa = 5.05, 6.3; Ultra violet absorption at 217 m$\mu$ (a$_m$ = 51,091) and 265 m$\mu$ (a$_m$ = 15,666); Molecular weight = 826 by mass spectroscopy corresponding to an empirical formula $C_{46}H_{58}N_4O_{10}$; Characteristic mass-spectral fragments as follows:

| Fragment | | Analysis | |
|---|---|---|---|
| | | Calculated | Found |
| M+ | $C_{46}H_{58}N_4O_{10}$ | 826.41530 | 826.41613 |
| M—OCH$_3$ | $C_{45}H_{55}N_4O_9$ | 795.39833 | 795.39763 |
| M—CH$_3$COO | $C_{44}H_{55}N_4O_8$ | 767.40199 | 767.40267 |
| M—(CH$_3$COO+18) | $C_{44}H_{53}N_4O_7$ | 749.39143 | 749.38747 |
| M—C$_6$H$_7$O$_5$ | $C_{40}H_{51}N_4O_5$ | 667.38595 | 667.38395 |
| M—(C$_6$H$_7$O$_5$+18) | $C_{40}H_{49}N_4O_4$ | 649.37538 | 649.37229 |
| m/e 469 | $C_{26}H_{33}N_2O_6$ | 469.2338 | 469.22936 |
| m/e 282 | $C_{14}H_{20}N\ O_5$ | 282.13415 | 282.13126 |
| m/e 170 | $C_{12}H_{12}N$ | 170.09697 | 170.09755 |
| m/e 170 | $C_9H_{16}N\ O_2$ | 170.11810 | 170.11731 |
| m/e 156 | $C_{11}H_{10}N$ | 156.08132 | 156.08161 |
| m/e 156 | $C_8H_{14}N\ O_2$ | 156.10245 | 156.10182 |
| m/e 154 | $C_9H_{16}N\ O$ | 154.12319 | 154.12432 |
| m/e 152 | $C_9\ H_{14}N\ O$ | 152.10754 | 152.10906 |
| m/e 144 | $C_{10}H_{10}N$ | 144.08132 | 144.08187 |
| m/e 143 | $C_{10}H_9\ N$ | 143.07350 | 143.07408 |

$^{13}$C Isotope peaks at m/e 827, 768, 750, 668, 650, 470, 171, 157, and 155 are in good agreement.

Leurocolombine had the following proton nmr spectrum:

| Resonance No. | Chemical Shift $^{(a)}$ | Assignment |
|---|---|---|
| 1 | 7.51 | H C-14' |
| 2 | 7.13 | H C-11', C-12', C-13' |
| 3 | 0.90 | CH$_3$-21' |
| 4 | 3.60 | COO$\underline{C}$H$_3$, C-18' carbomethoxy |
| 5 | 3.75 | H C-2 |
| 6 | 7.01 | H C-14 |
| 7 | 3.84 | CH$_3$O C-16 |
| 8 | 6.15 | H C-17 |
| 9 | 5.29 | H C-6 |
| 10 | 5.85 | H C-7 |
| 11 | 5.48 | H C-4 |
| 12 | 0.78 | CH$_3$-21 |

-Continued

| Resonance No. | Chemical Shift $^{(a)}$ | Assignment |
|---|---|---|
| 13 | 2.68 | H C-19 |
| 14 | 3.79 | COO$\underline{C}$H$_3$, C-3 carbomethoxy |
| 15 | 2.70 | N$\underline{C}$H$_3$ |
| 16 | 2.10 | O$\underline{C}$OCH$_3$, C-4 |

$^{(a)}$ In ppm ($\delta$) downfield from internal TMS. In addition to the usual proton resonances identified for this type of molecule, we resolve a resonance (d/4.168, j=15) typical of a methylene group attached to a heteroatom: —CH$_2$—X, where X=O, or N.

and the following 13$_C$ nmr spectrum:

| Peak No. | Chemical Shift: $^a$ | Assignment: |
|---|---|---|
| 1 | 174.3 | $\underline{C}$OOR, C-18' |
| 2 | 171.5 | acetate carbonyl, C-4 |
| 3 | 170.8 | $\underline{C}$OOR, C-3 |
| 4 | 158.6 | C-16 |
| 5 | 153.6 | C-18 |
| 6 | 135.1 | C-15' |
| 7 | 130.4 | C-17' |
| 8 | 129.8 | C-7 |
| 9 | 129.2 | C-10' |
| 10 | 124.4 | C-6 |
| 11 | 123.9 | C-13 |
| 12 | 123.6 | C-14 |
| 13 | 122.3 | C-12' |
| 14 | 120.0 | C-15 |
| 15 | 118.9 | C-13' |
| 16 | 118.4 | C-11' |
| 17 | 117.1 | C-9 |
| 18 | 110.4 | C-14' |
| 19 | 94.6 | C-17 |
| 20 | 83.2 | C-2 |
| 21 | 79.4 | C-3 |
| 22 | 76.2 | C-4 |
| 23 | 71.2 | C-2' |
| 24 | 69.9 | C-4' |
| 25 | 65.7 | C-19 |
| 26 | 63.5 | * |
| 27 | 55.9 | OCH$_3$ C-16 |
| 28 | 55.4 | * |
| 29 | 54.2 | C-18' |
| 30 | 53.2 | C-12 |
| 31 | 52.5 | COO$\underline{C}$H$_3$, C-18' |
| 32 | 52.2 | COO$\underline{C}$H$_3$, C-3 |
| 33 | 50.4 | C-8, 10 |
| 34 | 44.3 | C-11 |
| 35 | 42.6 | C-5 |
| 36 | 40.5 | * |
| 37 | 38.1 | N-$\underline{C}$H$_3$ |
| 38 | 33.9 | * |
| 39 | 30.8 | C-20 |
| 40 | 27.2 | * |
| 41 | 21.0 | OCOCH$_3$, C-4 |
| 42 | 8.3 | C-21 |
| 43 | 6.9 | C-21' |

$^a$ In ppm downfield from internal TMS
* Not assigned

Leurocolombine sulfate prepared by standard procedures and recrystallized from ethanol had the following X-ray powder diffraction pattern; using filtered chromium radiation at 2.2896A.

| d in A | I/I$_1$ |
|---|---|
| 17.00 | 30 |
| 12.50 | 100 |
| 9.45 | 50 |
| 7.70 | 10 |
| 7.20 | 60 |
| 6.20 | 20 |
| 5.70 | 30 |
| 4.95 | 05 |
| 4.65 | 20 |

The above information is consistent with the following postulated structure for leurocolombine:

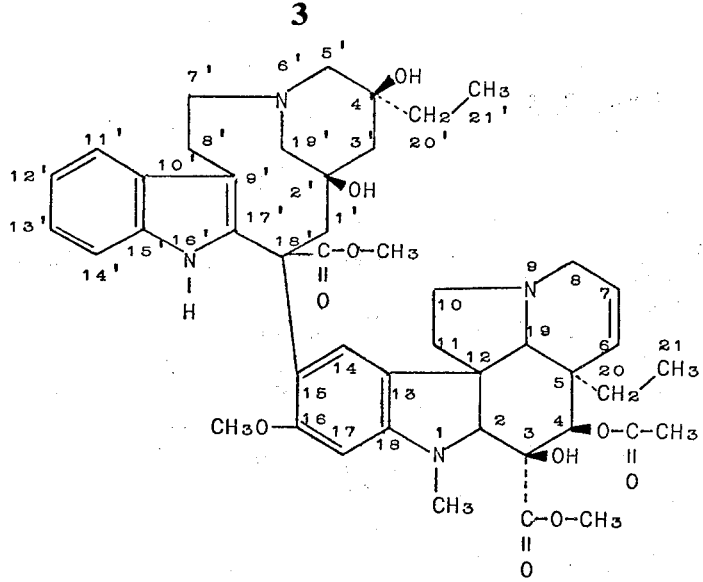

The presence of the tertiary hydroxyl at C-2' is further substantiated by the failure of the group to react with acetic anhydride under reaction conditions which successfully acetylate the C-3 hydroxyl and would be expected to acetylate other secondary hydroxyls, if present.

Leurocolombine is prepared according to the following procedure: Leaves of plants containing crude vinca alkaloids; ie, *Catharanthus roseus* (*Vinca rosea*), are extracted with a water-immiscible solvent such as benzene. The benzene is distilled from the extract in the presence of aqueous tartaric acid. The pH of the resulting aqueous acidic extract is adjusted to pH=6 by the addition of base. Alternatively, the leaves are contacted with an aqueous acid at pH=3, and the resulting acidic layer extracted with benzene. The benzene layer is separated and discarded, and the pH of the aqueous layer adjusted to pH=6 as before. The dimeric alkaloids are then extracted from the aqueous layer into an organic solvent, customarily benzene. An optional gel exclusion filtration step can be carried out on the extracted alkaloids using a cross-linked dextran gel (sephadex G-25 F), the mobile phase being a pH=3.0, 0.1M ammonium citrate buffer. A pressure of about 15 psi is employed during gel-exclusion chromatography. In this process, the dimeric alkaloid fraction containing vincristine, vinblastine, des-N-methylvinblastine, leuroformine, leurosine and vinrosidine is eluted first. The dimeric alkaloids are extracted from the pH=3 buffer by adjusting the pH to pH=7.0 with base and then extracting the resulting aqueous solution with a water-immiscible solvent, preferably again benzene. Evaporation of the benzene yields a residue which can be dissolved in ethanol and leurosine crystallized directly therefrom. The leurosine crystals are separated by decantation, and the supernatant thus obtained is acidified to pH=4.2 with 3 percent ethanolic sulfuric acid to convert the remaining dimeric alkaloids to their sulfate salts which precipitate. The precipitated salts are collected and are converted to the corresponding free alkaloidal bases by standard procedures as, for example, by dissolving the salts in water, adjusting the pH ≈ 8.0 with ammonium hydroxide and extracting the dimeric alkaloids with a water-immiscible organic solvent, preferably methylenedichloride. Evaporation of the methylenedichloride yields the mixed dimeric alkaloids which are then chromatographed at high pressure over alumina (Activity III-IV) using a ethyl acetate-methylenedichloride-water (25:75:0.4) solvent system as the eluant.

Operating pressures employed have been in the range 150–350 psi. As will be understood by those skilled in the art of high-pressure chromatography, equipment is available to carry out procedures at 4000–5000 psi and pressures in the range 7500–8000 psi appear feasible. Alkaloidal separation is in general more efficient at the higher pressures. High-pressure chromatography procedures are carried out in stainless steel equipment equipped with pressure resistant fittings.

The alkaloids are eluted in the following order in this chromatographic procedure: residual leurosine, vinblastine, leurocolombine, des-N-methylvinblastine, vincristine and vinrosidine. Identification of the dimeric alkaloids in the eluant fraction is carried out by standard procedures known to the art, as by thin layer chromatography.

Leurocolombine occurs in minor quantities in the chromatographic fractions obtained after the fractions from which substantially pure VLB is isolated and prior to those fractions from which substantially pure leurocristine is isolated. Leurocolombine is obtained from these intermediate fractions by a gradient pH purification procedure -- see Svoboda - U.S. Pat. No. 3,205,220, Col. 3, line 70 et seq and Col. 6, line 65 et seq. for a description of this procedure in purifying two other alkaloids from *Catharanthus roseus*, leurocristine and leurosidine.

EXAMPLE 1

LEUROCOLOMBINE

Two-thousand two-hundred-fifty kilograms of dry *Catharanthus roseus* leaf were extracted five times for one-hour periods, using 28 volumes of benzene basified by the addition of 28 percent (w/v) ammonium hydroxide as the extracting medium. The benzene extracts were decanted from fibrous material, combined and filtered. The benzene extract was evaporated in the presence of aqueous tartaric acid at pH=3.1. The resulting solution was filtered and extracted twice with equal volumes of benzene. The benzene extracts were separated and discarded. The pH of the filtrate was then raised to pH=6.0 by the addition of concentrated ammonium hydroxide. The aqueous phase at pH=6.0 was extracted three times with equal volumes of benzene. The benzene extracts were combined and concentrated in vacuo to yield as a residue 6650 g. of a crude alkaloid mixture (VRA). The mixture was dissolved in 5.0 volumes of anhydrous ethanol and adjusted to pH = 4.2 with 3 percent ethanolic sulfuric acid. Sulfates of the remaining dimeric alkaloids formed immediately as needles, and crystallization was allowed to continue for two days. The crystals were separated by centrifugation, washed with ethanol and dried. A precipitate of mixed sulfate salts or vinblastine, des-N-methyl vinblastine and vincristine, plus a small quantity of leurosine was obtained. The salts were converted to the corresponding free bases by dissolving the salts in water, adjusting the pH of the aqueous solution to 8.0 with 14 N ammonium hydroxide and then extracting the water-insoluble bases into methylenechloride. The methylenechloride extract was filtered, and the solvent removed by evaporation in vacuo. The resulting residue was chromatographed in a series of 50 g. runs over 15 kg. of alumina (Activity III-IV, 200 m$^2$/g) using an ethyl acetate-methylenedichloride-water (25:75:04) solvent system as the eluant. Chromatography was carried out in a stainless steel column, 5 × 700 cm, at a pressure of 250–325 psi. The alumina-to-charge ratio was approximately 300/1. The eluate was monitored at 280 mu, and fractions were separated based upon the peaks observed in the ultraviolet profile. Fractions were identified containing predominantly leurosine, vinblastine, and vincristine by thin layer chromatography. 20 g. of post-VLB-pre-leurocristine cuts were accumulated and subjected to a gradient pH purification procedure. Fractions were obtained at 9 different pH's starting at pH=2.70 and ending at pH=7.50. Table 1 below gives the total weight of alkaloid obtained from each of these fractions. In addition, each fraction was treated with alcoholic sulfuric acid and the sulfates formed were isolated. Table 1 also gives the weights of bases and weights of sulfates obtained from each of the pH fractions.

Table 1

| pH | Total Weight (g) | Bases (g) | Sulfates (g) |
|---|---|---|---|
| 2.70 | 2.275 | | |
| 3.40 | 1.09 | | |
| 3.90 | 1.43 | 0.1474 | 0.2987 |
| 4.40 | 2.60 | 0.1389 | 1.457 |
| 4.90 | 3.58 | | 2.5695 |
| 5.40 | 3.62 | | 2.582 |
| 5.90 | 2.57 | | 1.612 |
| 6.40 | 0.65 | | 0.0231 |
| 7.50 | 0.36 | | |

Direct crystallization of the bases from methanol yielded mixed crystals of leurocolombine with leurosine and with VLB, as determined by a thin layer chromatography of the fractions obtained at pH=3.90 and pH=4.40. Thin layer chromatography also demonstrated the presence of other trace impurities giving the typical color reactions of the dimeric indole-dihydroindole alkaloids. Mixed sulfates containing VLB, leurosine, desacetyl VLB and leurocolombine plus trace quantities of still unidentified dimeric alkaloids were obtained at pH=3.90, 4.40 and 4.90.

The mixed sulfates from the above three fractions containing leurocolombine sulfate were combined and dissolved in two liters of hot ethanol. An amorphous precipitate of mixed sulfates weighing 2.2184 g. was obtained and its further purification is outlined below. Subsequent crops of amorphous sulfates totaling 702.3 mg. were harvested by further chilling and concentrating the mother liquor from the first filtration. This second crop comprising the combined amorphous sulfates was converted to the free base by treatment with ammonium hydroxide according to the standard procedures and the resulting free bases subjected to preparative thin layer chromatography (TLC) as follows: about 100 mg. of the free bases were applied to a 20 × 20 cm. silica gel preparative thin layer chromatography plate. The developing solvent was a diethylether: diethylamine: toluene: methanol solvent mixture in the ratio 100:5:5:5. Bands containing alkaloidal substances were distinguished by their ultra-violet quenching effect and were scraped off and the alkaloid eluted therefrom by mixture of chloroform and methanol. Repeating this preparative procedure seven times yielded 105 mg. of leurocolombine as a separate fraction.

The first crop of sulfates referred to above weighing 2.2184 g. was also converted to the corresponding free bases which were again subjected to gradient pH purification. Leurocolombine was found in fractions obtained at pH=3.90, 4.40, and 4.90. Again, leurocolombine appeared to co-crystallize with VLB. The alkaloids obtained from these gradient pH fractions were combined and subjected to a preparative thin layer chromatography as before. An additional 150.6 mg. of leurocolombine were thus obtained. The estimated occurrence of leurocolombine based upon the original weight of *Catharanthus roseus* leaf is 33 ppb.

As previously stated, leurocolombine is an antimitotic agent with potential utility as an anti-tumor drug. Leurocolombine has the ability to arrest cultured cells at the mitotic phase (metaphase) of the cell cycle without apparent effect on other stages of the cell cycle. Most of the known antitumor indole-dihydroindole (dimeric alkaloids from *Catharanthus roseus* have the ability to cause metaphase arrest, including vincaleucoblastine (VLB), leurocristine and leurosine. Monomeric vinca alkaloids do not possess metaphase arrest activity and are not antimitotics. Leurocolombine demonstrates its metaphase arrest activity at concentration in the range $2 \times 10^{-2}$ mcg./ml. with marginal activity at $2 \times 10^{-3}$ mcg./ml. In this test, the VLB standard was active at $2 \times 10^{-3}$ mcg./ml.

Leurocolombine has also demonstrated activity against a transplanted tumor in mice, Ridgeway osteogenic sarcoma. The compound gave a 27 percent inhibition of tumor growth at a 15 mg./kg. dose daily for 10 days.

We claim:

1. Leurocolombine, represented by the formula:

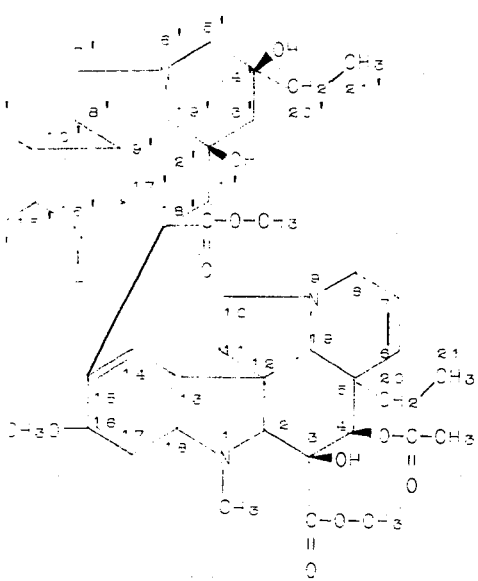

and a pharmaceutically-acceptable acid addition salt, formed with a non-toxic acid.

2. Leurocolombine having the following characteristics:

pKa'5 at 5.05, 6.3;

Infra-red absorption maxima at 2.80, 2.88, 3.35, 5.74, 6.18, 6.65, 6.82, 6.95, 7.25, 7.50, 8.11, 9.60, 9.90 and 10.75 microns;

Ultra-violet absorption maxima at 217 ($a_m$=51.091) and 265 ($a_m$=15,666) millimicrons;

Molecular weight, 826;

Empirical formula, $C_{46}H_{58}N_4O_{10}$;

Ion fragments by mass spectroscopy, m/e 795, 767, 749, 667, 649, 282, 170, 156, 154, 152, 144, 143;

proton nmr spectrum, chemical shifts in ppm at 7.51, 7.13, 0.90, 3.60, 3.75, 7.01, 3.84, 6.15, 5.29, 5.85, 5.48, 0.78, 2.68, 3.79, 2.70, 2.10 and 4.16; and forming a sulfate salt with the following X-ray powder diffraction pattern using filtered chromium radiation at 2.2896A

| d in A | $I/I_2$ |
|--------|---------|
| 17.00  | 30      |
| 12.50  | 100     |
| 9.45   | 50      |
| 7.70   | 10      |
| 7.20   | 60      |
| 6.20   | 20      |
| 5.70   | 30      |
| 4.95   | 05      |
| 4.65   | 20.     |

* * * * *